(12) United States Patent
Luo et al.

(10) Patent No.: US 12,741,669 B2
(45) Date of Patent: Sep. 22, 2026

(54) AUGMENTING LANE-TOPOLOGY REASONING WITH A STANDARD DEFINITION NAVIGATION MAP

(71) Applicant: NVIDIA Corporation, Santa Clara, CA (US)

(72) Inventors: Katie Z. Luo, Ithaca, NY (US); Yue Wang, Los Angeles, CA (US); Xinshuo Weng, North York (CA); Marco Pavone, Stanford, CA (US); Yan Wang, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 114 days.

(21) Appl. No.: 18/747,265

(22) Filed: Jun. 18, 2024

(65) Prior Publication Data

US 2025/0091605 A1 Mar. 20, 2025

Related U.S. Application Data

(60) Provisional application No. 63/538,757, filed on Sep. 15, 2023.

(51) Int. Cl.
*G01C 21/30* (2006.01)
*B60W 60/00* (2020.01)

(52) U.S. Cl.
CPC ........... *B60W 60/001* (2020.02); *G01C 21/30* (2013.01); *B60W 2420/403* (2013.01); *B60W 2552/00* (2020.02); *B60W 2552/53* (2020.02)

(58) Field of Classification Search
CPC ......... B60W 60/001; B60W 2420/403; B60W 2552/00; B60W 2552/53; G01C 21/30; G01C 21/38; G01C 21/3841
See application file for complete search history.

(56) References Cited

U.S. PATENT DOCUMENTS

2024/0246575 A1* 7/2024 Huang .................. G06V 10/82
2025/0216847 A1* 7/2025 Zhang .................. G06N 3/0442

FOREIGN PATENT DOCUMENTS

CN 116597267 A * 8/2022 ........... G06V 10/806
CN 116450761 A * 7/2023 ............ G06F 16/29

OTHER PUBLICATIONS

"Li. J., et al., 'Augmenting Lane Perception and Topology Understanding with Standard Definition Navigation Maps', Nov. 7, 2023" (Year: 2023).*
"Wu. H., et al., 'BLOS-BEV: Navigation Map Enhanced Lane Segmentation Network, Beyond Line of Sight', Jun. 2-5, 2024" (Year: 2024).*

(Continued)

*Primary Examiner* — Sahar Motazedi
(74) *Attorney, Agent, or Firm* — Zilka-Kotab, P.C.

(57) ABSTRACT

In the context of autonomous driving, the recognition of lane topologies is required for the vehicle to make well-informed and prudent decisions such as lane changes, navigation through intricate intersections, and smooth merging. Current autonomous driving systems rely solely on sensor (e.g. camera) inputs to recognize lane topology. As a result, poor sensor data will have a direct negative impact on lane topology recognition. The present disclosure augments lane topology reasoning with a standard definition navigation map for use in autonomous driving applications.

27 Claims, 10 Drawing Sheets

(56) References Cited

OTHER PUBLICATIONS

Zhang. L., et. al., 'Hierarchical Road Topology Learning for Urban Mapless Driving', Oct. 23-27, 2022 (Year: 2022).*
"Ort. T., et al., 'MapLite 2.0: Online HD Map Inference Using a Prior SD Map', Jul. 2022" (Year: 2022).*
"Wu. X., et. al., 'Pix2Map: Cross-modal Retrieval for Inferring Street Maps from Images', Apr. 9, 2023" (Year: 2023).*
Machine Translation of CN-116450761-A (Year: 2023).*
Machine Translation of CN-116597267-A (Year: 2023).*
Wang et al., "OpenLane-V2: A Topology Reasoning Benchmark for Scene Understanding in Autonomous Driving," arXiv, 2023, 15 pages, retrieved from https://arxiv.org/pdf/2304.10440v2.
Wang et al., "HDMapNet: An Online HD Map Construction and Evaluation Framework," IEEE International Conference on Robotics and Automation (ICRA), 2022, 7 pages, retrieved from https://www.semanticscholar.org/paper/HDMapNet%3A-An-Online-HD-Map-Construction-and-Li-Wang/2d83847147950c34aaef87ee2ad074b2b3037a64.
Sadat et al., "Perceive, Predict, and Plan: Safe Motion Planning Through Interpretable Semantic Representations," European Conference on Computer Vision, 2020, 28 pages, retrieved from https://arxiv.org/abs/2008.05930.
Shi et al., "Motion Transformer with Global Intention Localization and Local Movement Refinement," 36th Conference on Neural Information Processing Systems (NeurIPS), 2022, pp. 1-13.
Vaswani et al., "Attention Is All You Need," 31st Conference on Neural Information Processing Systems (NIPS), 2017, pp. 1-11.
Li et al., "Graph-based Topology Reasoning for Driving Scenes," arXiv, 2023, pp. 1-12, retrieved from https://arxiv.org/pdf/2304.05277.
Wu et al., "The 1st-place Solution for CVPR 2023 OpenLane Topology in Autonomous Driving Challenge," arXiv, 2023, pp. 1-4, retrieved from https://arxiv.org/pdf/2306.09590.
Lu et al., "Separated RoadTopoFormer," arXiv, 2023, 4 pages, retrieved from https://arxiv.org/pdf/2307.01557.
Liu et al., "VectorMapNet: End-to-end Vectorized HD Map Learning," arXiv, 2023, pp. 1-18, retrieved from https://arxiv.org/pdf/2206.08920v6.
Shin et al., "InstaGraM: Instance-level Graph Modeling for Vectorized HD Map Learning," arXiv, 2023, pp. 1-11, retrieved from https://arxiv.org/pdf/2301.04470.
Ding et al., "PivotNet: Vectorized Pivot Learning for End-to-end HD Map Construction," ICCV, 2023, 17 pages, retrieved from https://arxiv.org/abs/2308.16477.
Zhang et al., "Online Map Vectorization for Autonomous Driving: A Rasterization Perspective," 37th Conference on Neural Information Processing Systems (NeurIPS), 2023, 16 pages, retrieved from https://arxiv.org/pdf/2306.10502.
Liao et al., "MapTR: Structured Modeling and Learning for Online Vectorized HD Map Construction," ICLR, 2023, pp. 1-18.
Xu et al., "InsightMapper: A Closer Look at Inner-instance Information for Vectorized High-Definition Mapping," arXiv, 2023, 22 pages, retrived from https://arxiv.org/pdf/2308.08543v3.
Liao et al., "Lane Graph as Path: Continuity-preserving Path-wise Modeling for Online Lane Graph Construction," arXiv, 2023, 10 pages, retrieved from https://arxiv.org/pdf/2303.08815.
Chen et al., "Graph-based Topology Reasoning for Driving Scenes," arXiv, 2023, pp. 1-12, retrieved from https://arxiv.org/pdf/2304.05277.
Xiong et al., "Neural Map Prior for Autonomous Driving," CVPR, 2023, pp. 17535-17544, retrieved from https://openaccess.thecvf.com/content/CVPR2023/papers/Xiong_Neural_Map_Prior_for_Autonomous_Driving_CVPR_2023_paper.pdf.
Can et al., "Prior Based Online Lane Graph Extraction from Single Onboard Camera Image," arXiv, 2023, 9 pages, retrieved from https://arxiv.org/pdf/2307.13344.
Gao et al., "Complementing Onboard Sensors with Satellite Map: A New Perspective for HD Map Construction," ariv, 2024, 7 pages, retrieved from https://arxiv.org/pdf/2308.15427.
Zhu et al., "NeMO: Neural Map Growing System for Spatiotemporal Fusion in Bird's-Eye-View and BDD-Map Benchmark," arXiv, 2023, 17 pages, retrieved from https://arxiv.org/pdf/2306.04540.
Yuan et al., "StreamMapNet: Streaming Mapping Network for Vectorized Online HD Map Construction," arXiv, 2023, 15 pages, retrieved from https://arxiv.org/pdf/2308.12570.
Li et al., "Bi-Mapper: Holistic BEV Semantic Mapping for Autonomous Driving," Preprint for IEEE Robotics and Automation Letters, 2023, 8 pages, retrieved from https://arxiv.org/pdf/2305.04205.
Wang et al., "DETR3D: 3D Object Detection from Multi-view Images via 3D-to-2D Queries," 5th Conference on Robot Learning (CoRL), 2021, pp. 1-12.
Wang et al., "BEVFormer: Learning Bird's-Eye-View Representation from Multi-Camera Images via Spatiotemporal Transformers," ECCV, 2022, 18 pages, retrieved from https://www.ecva.net/papers/eccv_2022/papers_ECCV/papers/136690001.pdf.
Liu et al., "PETR: Position Embedding Transformation for Multi-View 3D Object Detection," ECCV, 2022, 18 pages, retrieved from https://www.ecva.net/papers/eccv_2022/papers_ECCV/papers/136870523.pdf.
Chen et al., "FUTR3D: A Unified Sensor Fusion Framework for 3D Detection," CVPR, 2023, pp. 172-181, retrieved from https://openaccess.thecvf.com/content/CVPR2023W/WAD/papers/Chen_FUTR3D_A_Unified_Sensor_Fusion_Framework_for_3D_Detection_CVPRW_2023_paper.pdf.
Wilson et al., "Argoverse 2: Next Generation Datasets for Self-Driving Perception and Forecasting," 35th Conference on Neural Information Processing Systems (NeurIPS), 2021, pp. 1-13.
Zhu et al., "Deformable DETR: Deformable Transformers for End-to-End Object Detection," ICLR, 2021, pp. 1-16.
Kipf et al., "Semi-Supervised Classification with Graph Convolutional Networks," ICLR, 2017, pp. 1-14.
Yang et al., "HDNET: Exploiting HD Maps for 3D Object Detection," Proceedings of The 2nd Conference on Robot Learning, PMLR, 2018, 10 pages.
Gao et al., "VectorNet: Encoding HD Maps and Agent Dynamics from Vectorized Representation," CVPR, 2020, pp. 11525-11533.
Simonelli et al., "Are we Missing Confidence in Pseudo-LiDAR Methods for Monocular 3D Object Detection?" ICCV, 2021, pp. 3225-3233, retrieved from https://openaccess.thecvf.com/content/ICCV2021/papers/Simonelli_Are_We_Missing_Confidence_in_Pseudo-LiDAR_Methods_for_Monocular_3D_ICCV_2021_paper.pdf.
Openstreetmap, "Welcome to OpenStreetMap," 2024, 3 pages, retrieved from https://www.openstreetmap.org/#map=4/34.96/-111.97 on Aug. 9, 2024.

* cited by examiner encoding a representation of a map having a road-level topology to form an encoded representation of the map
102 using the encoded representation of the map during lane-topology reasoning by a lane-topology model
104

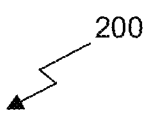

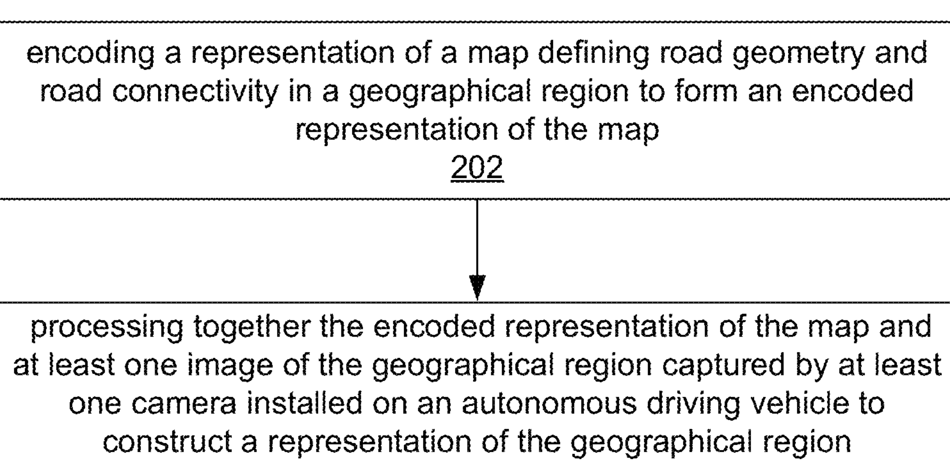

performing lane-topology reasoning by a lane-topology model, using the representation of the geographical region, to detect one or more road-level features within the geographical region
206 outputting the one or more road-level features to an autonomous driving application for use in making one or more autonomous driving decisions for the autonomous driving vehicle
208

*Fig. 2*

(a) SD Map (b) Topology Reasoning (c) Lane Centerlines

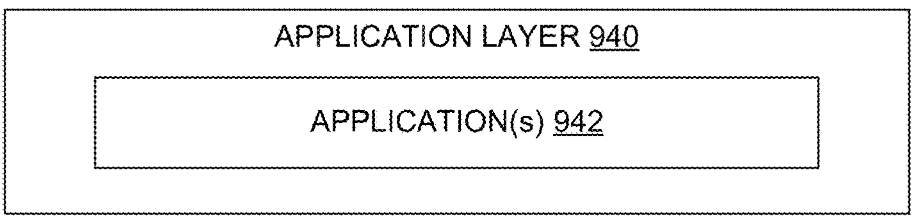
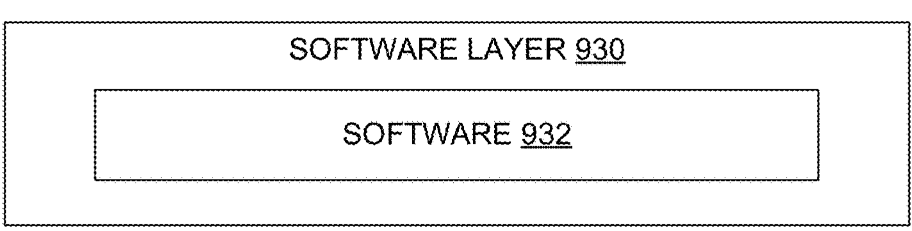
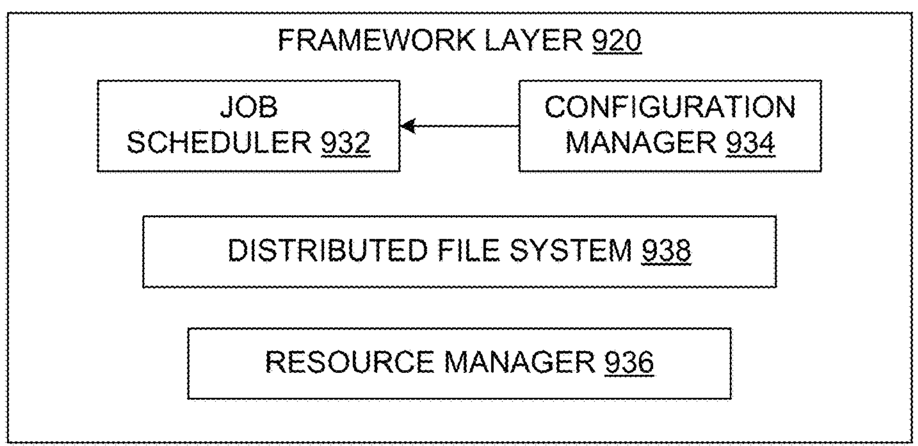
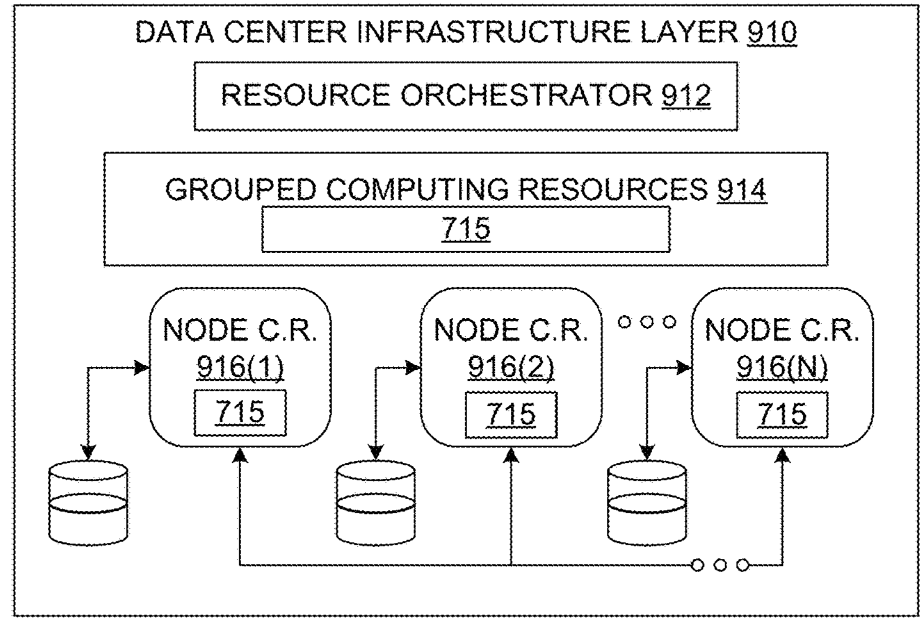
*Fig. 9*

AUGMENTING LANE-TOPOLOGY REASONING WITH A STANDARD DEFINITION NAVIGATION MAP

CLAIM OF PRIORITY

This application claims the benefit of U.S. Provisional Application No. 63/538,757 titled "LANE TOPOLOGY RECOGNITION WITH STANDARD DEFINITION MAP ASSISTANCE," filed Sep. 15, 2023, the entire contents of which is incorporated herein by reference.

TECHNICAL FIELD

The present disclosure relates to the lane topology reasoning for autonomous vehicle operations.

BACKGROUND

In the context of autonomous driving, the recognition of lane topologies plays an integral role, enabling the vehicle to make well-informed and prudent decisions such as lane changes, navigation through intricate intersections, and smooth merging. Some current autonomous driving systems rely solely on sensor inputs to recognize lane topology. These sensor inputs generally refer to the images or other data collected by sensors (e.g. cameras) located on the self-driving vehicle. However, sensor data alone can be inadequate with regards to lane topology recognition for autonomous driving. For example, the quality of the derived lane topology is tied directly to the quality of the sensor inputs.

Other autonomous driving systems are adapted to consider high-definition (HD) navigation maps when making driving decisions. HD maps typically include centimeter level map elements such as road boundaries, lane dividers, road markings, and traffic signs, as well as lane graphs and association of lanes to traffic signs. This precision mapping removes ambiguity from self-driving, making HD maps critical enablers for essentially all commercial robo-taxi services. In addition, HD maps also annotate areas like construction zones and pedestrian crossings to be high alert areas. While HD maps provide a solution for reliable self-driving, such maps are prohibitively expensive to obtain as each area needs to be painstakingly annotated by humans and continuously updated to reflect any changes in road conditions.

There is a need for addressing these issues and/or other issues associated with the prior art. For example, there is a need to augment lane topology reasoning with a standard definition navigation map.

SUMMARY

A method, computer readable medium, and system are disclosed for lane topology reasoning. A representation of a map having a road-level topology is encoded to form an encoded representation of the map. The encoded representation of the map is used during lane-topology reasoning by a lane-topology model.

BRIEF DESCRIPTION OF THE DRAWINGS

FIG. 2 illustrates a flowchart of a method for using an encoded representation of a map together with captured images to perform lane-topology reasoning, in accordance with an embodiment.

FIG. 9 illustrates an example data center system, according to at least one embodiment.

DETAILED DESCRIPTION

Figure 1:
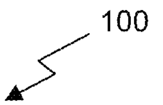
FIG. 1 illustrates a flowchart of a method for using an encoded representation of a map during lane-topology reasoning, in accordance with an embodiment.

FIG. 1 illustrates a flowchart of a method 100 for using an encoded representation of a map during lane-topology reasoning, in accordance with an embodiment. The method 100 may be performed by a device, which may be comprised of a processing unit, a program, custom circuitry, or a combination thereof, in an embodiment. In another embodiment a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, a representation of a map having a road-level topology is encoded to form an encoded representation of the map. With respect to the present description, the map refers to a diagrammatic representation of an area of land that has, at least in part, a road-level topology. In an embodiment, the map may be a standard definition (SD) map. In an embodiment, the map may represent an area in which an autonomous driving vehicle that uses the lane-topology reasoning is located.

The road-level topology refers to a depiction of roads (e.g. driving lanes) designed to be driven on by vehicles (e.g. cars, trucks, etc.). In an embodiment, the road-level topology may include information defining road geometry. In an embodiment, the road-level topology may include information defining road connectivity (i.e. connectivity between roads). In an embodiment, the map may also include annotations (e.g. metadata) indicating road types for each road segment defined in the road-level topology.

The representation of the map refers to a format in which the map is defined. The representation of the map may be generated by processing an existing electronic map depicting roads within a geographical area. In an embodiment, the representation of the map may be a polyline-sequence representation. In an embodiment, the method 100 may include generating the polyline-sequence representation by sampling the map along each of a plurality of polylines for a fixed number of points. In an embodiment, sinusoidal embeddings with varied frequencies may be used to encode polyline point locations in the polyline-sequence representation.

As mentioned above, the representation of the map is encoded to form an encoded representation of the map. The encoding may be performing using an algorithm that transforms the representation of the map into a format capable of being processed by a lane-topology model, which will be described in detail below. In an embodiment, the representation of the map may be encoded by a transformer encoder. In an embodiment, the transformer encoder may learn a feature representation from the representation of the map. In an embodiment, the representation of the map may be encoded by embedding the representation of the map with a linear layer of the transformer encoder, and utilizing a number of layers of multi-head self-attention to extract and encode global geometric and semantic information into a feature representation. To this end, the encoded representation of the map may be a feature representation of the map, in an embodiment.

In operation 104, the encoded representation of the map is used during lane-topology reasoning by a lane-topology model. The lane-topology model refers to a machine learning model that has been trained to make lane topology predictions from a given input. The lane-topology model may use the encoded representation of the map for lane-topology reasoning without requiring further tuning. The lane topology predictions may include lane (e.g. traffic lane, roadway, section of road for a single line of traffic, etc.) detection, lane centerline detection, traffic element detection, connectivity of lane centerlines and relation of lane centerlines to traffic elements, and/or any other information corresponding to lanes over which a vehicle may travel.

In an embodiment, the lane-topology model may be a transformer-based model. In an embodiment, the lane-topology model may generate a feature representation from at least one image captured by at least one camera or other sensor. In an embodiment, the feature representation may be a bird's-eye-view representation. In an embodiment, the at least one camera may be installed on an autonomous driving vehicle that uses the lane-topology reasoning.

In an embodiment, the lane-topology model may apply cross-attention between the feature representation generated from the at least one image and the encoded representation of the map to construct a combined feature representation. In an embodiment, the lane-topology reasoning may be performed using the combined feature representation. The lane-topology reasoning may include detecting one or more road-level features within the geographical region covered by the map. As mentioned above, this lane-topology reasoning may include lane detection, detection of lane centerlines, detection of traffic elements, inferring connectivity of lane centerlines and relation of lane centerlines to traffic elements, etc.

The lane-topology reasoning may be used by an autonomous driving application to make autonomous driving decisions for an autonomous driving vehicle. In an embodiment, a result of the lane-topology reasoning (e.g. a prediction made by the lane-topology reasoning) may be output to the autonomous driving application for use in making an autonomous driving decision for the autonomous driving vehicle. The autonomous driving decision may include changing a direction of travel of the autonomous driving vehicle, starting movement of the autonomous driving vehicle, stopping movement of the autonomous driving vehicle, slowing movement of the autonomous driving vehicle, changing a driving lane of the autonomous driving vehicle, etc. In an embodiment, the autonomous driving application may control the autonomous driving vehicle in accordance with the autonomous driving decision.

To this end, the method 100 augments lane topology reasoning with a map by encoding the map and processing the same by a lane-topology model. This augmentation improves results of the lane topology reasoning by the lane-topology model, namely by improving an accuracy of the predictions made by the lane-topology model. For example, when merging or exit roads are not visible in the camera images of an autonomous driving vehicle due to occlusion, the map can provide priors for more accurate downstream planning. Additionally, the map may provide priors over the existence of intersections before the autonomous driving vehicle approaches. This prior knowledge is helpful for long-horizon behavior planning, such as switching to a left lane early before making a left turn at the intersection. Furthermore, the method 100 may rely specifically on SD maps which mark out road-level topology with metadata and which are more readily available than HD maps.

Further embodiments will now be provided in the description of the subsequent figures. It should be noted that the embodiments disclosed herein with reference to the method 100 of FIG. 1 may apply to and/or be used in combination with any of the embodiments of the remaining figures below.

FIG. 2 illustrates a flowchart of a method 200 for using an encoded representation of a map together with captured images to perform lane-topology reasoning, in accordance with an embodiment. The method 200 may be carried out in the context of the method 100 of FIG. 1, in an embodiment. The descriptions and definitions provided above may equally apply to the present embodiments.

In operation 202, a representation of a map defining road geometry and road connectivity in a geographical region is encoded to form an encoded representation of the map. In an embodiment, the map may be a SD map. In an embodiment, the SD map may be accessed from an online source. In an embodiment, the map may cover a geographical region in which an autonomous driving vehicle (that will use the lane-topology reasoning) is located. In an embodiment, the map may include annotations indicating road types for each road segment defined in the map.

In an embodiment, the representation of the map may be a polyline-sequence representation. The polyline-sequence representation may be generated by sampling the map along each of a plurality of polylines for a fixed number of points. In an embodiment, sinusoidal embeddings with varied frequencies may be used to encode polyline point locations in the polyline-sequence representation.

In an embodiment, the representation of the map may be encoded by a transformer encoder. In an embodiment, the transformer encoder may learn a feature representation from the representation of the map. In an embodiment, the representation of the map may be encoded by embedding the representation of the map with a linear layer of the transformer encoder, and utilizing a number of layers of multi-head self-attention to extract and encode global geometric and semantic information into a feature representation.

In operation 204, the encoded representation of the map and at least one image of the geographical region captured by at least one camera installed on an autonomous driving vehicle are processed together to construct a representation of the geographical region. In operation 206, lane-topology reasoning is performed by a lane-topology model, using the representation of the geographical region, to detect one or more road-level features within the geographical region. In an embodiment, the representation of the geographical region may be generated by the lane-topology model. In an embodiment, the lane-topology model may be a transformer-based model.

In an embodiment, the lane-topology model may generate a feature representation from the at least one image captured by the at least one camera installed on the autonomous driving vehicle. In an embodiment, the feature representation may be a bird's-eye-view representation. In an embodiment, the lane-topology model may then apply cross-attention between the feature representation generated from the at least one image and the encoded representation of the map to construct the representation of the geographical region, where the representation of the geographical region is a combined feature representation.

In an embodiment, the lane-topology reasoning may be performed using the combined feature representation to detect the road-level feature(s). The road-level feature(s) detected by the lane-topology model may include at least one driving lane, at least one centerline of at least one driving lane, at least one traffic element (e.g. traffic light, stop sign, etc.), and/or connectivity of driving lane centerlines and relation of driving lane centerlines to traffic elements.

In operation 208, the one or more road-level features are output to an autonomous driving application for use in making one or more autonomous driving decisions for the autonomous driving vehicle. The autonomous driving decision may include changing a direction of travel of the autonomous driving vehicle, starting movement of the autonomous driving vehicle, stopping movement of the autonomous driving vehicle, slowing movement of the autonomous driving vehicle, changing a driving lane of the autonomous driving vehicle, etc. In an embodiment, the autonomous driving application may control the autonomous driving vehicle in accordance with the autonomous driving decision.

Figure 3:
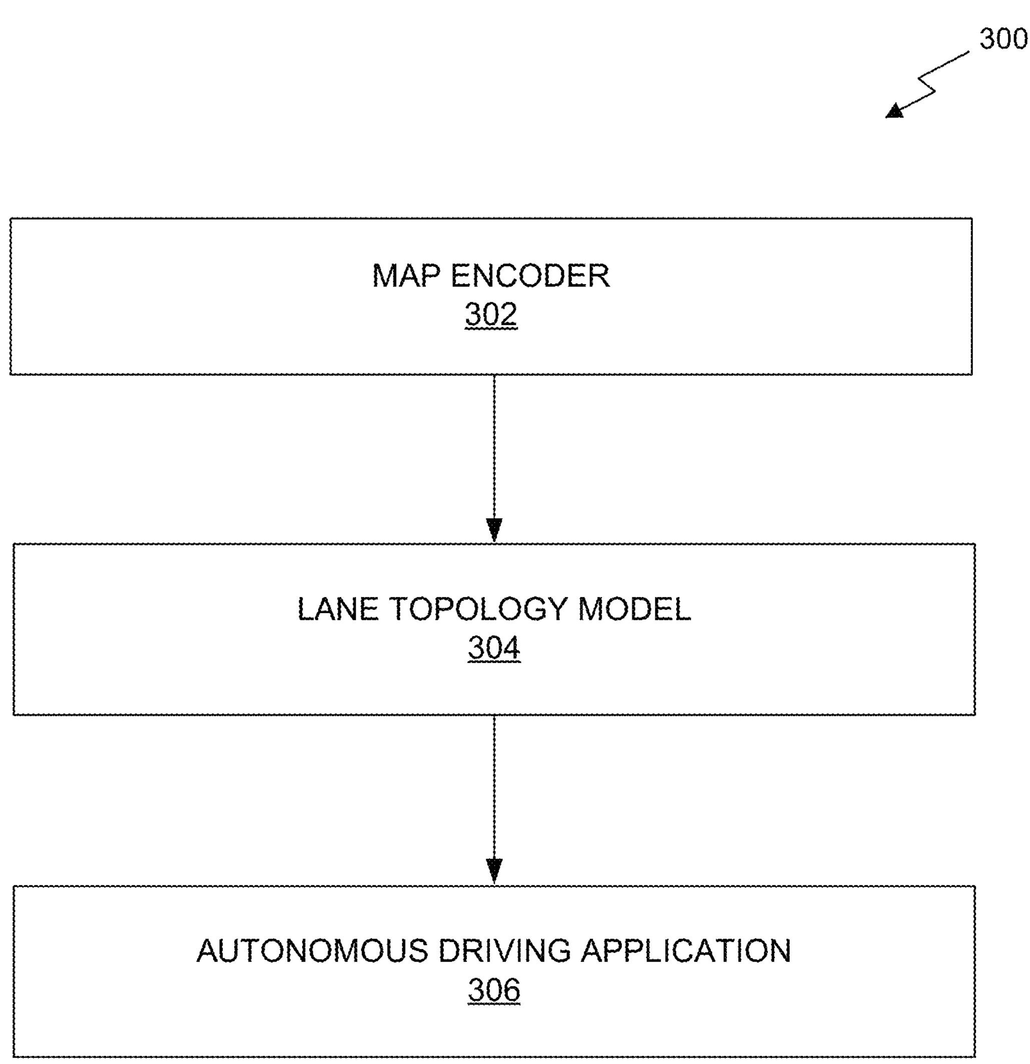
FIG. 3 illustrates an autonomous driving system that uses an encoded representation of a map for lane-topology reasoning, in accordance with an embodiment.

FIG. 3 illustrates an autonomous driving system 300 that uses an encoded representation of a map for lane-topology reasoning, in accordance with an embodiment. The autonomous driving system 300 may be implemented in the context of the any of the embodiments described above. Accordingly, the descriptions and definitions provided above may equally apply to the present embodiments.

As shown, the autonomous driving system 300 includes a map encoder 302. The map encoder 302 is configured to encode a representation of a map having a road-level topology to form an encoded representation of the map. The map encoder 302 may be a transformer encoder, in an embodiment.

The encoded representation of the map is output from the map encoder 302 to a lane topology model 304. The lane topology model 304 is configured to use the encoded representation of the map during lane-topology reasoning. The lane topology model 304 may process the encoded representation of the map together with one or more images of a same geographical area covered by the map, to detect one or more road-level features within the geographical region.

A result of the lane-topology reasoning performed by the lane topology model 304 (e.g. one or more road-level features) is output to an autonomous driving application 306. The autonomous driving application 306 processes the road-level feature(s) to make an autonomous driving decision for an autonomous driving vehicle. The autonomous driving decision may include changing a direction of travel of the autonomous driving vehicle, starting movement of the autonomous driving vehicle, stopping movement of the autonomous driving vehicle, slowing movement of the autonomous driving vehicle, changing a driving lane of the autonomous driving vehicle, etc. In an embodiment, the autonomous driving application may control the autonomous driving vehicle in accordance with the autonomous driving decision.

It should be noted that any combination of the map encoder 302, lane topology model 304 and autonomous driving application 306 may be located locally on the autonomous driving vehicle or remotely from the autonomous driving vehicle (e.g. in a cloud). In an embodiment, the map encoder 302 and lane topology model 304 may be located in a cloud to perform the lane-topology reasoning remotely from the autonomous driving vehicle, whereas the autonomous driving application 306 may be located locally on the autonomous driving vehicle. In this embodiment, an image captured within a geographical region of the autonomous driving vehicle (e.g. by a camera installed on the autonomous driving vehicle) may be communicated to the lane topology model 304 and the map encoder 302 may be caused to access and encode the map of the geographical region of the autonomous driving vehicle. The lane topology model 304 may the process both the encoded map and the image for lane-topology reasoning. The result of the lane-topology reasoning may be communicated from the lane topology model 304 to the autonomous driving application 306 via a communication network. In an embodiment where the map encoder 302 and lane topology model 304 are located in a cloud, these cloud-based components may function to provide lane-topology reasoning for any number of different autonomous driving vehicles.

In one exemplary embodiment, a method for operating an autonomous vehicle having a device and at least one camera may include, at the device, processing together an encoded representation of a map defining road geometry and road connectivity in a geographical region and at least one image of the geographical region captured by the at least one camera to construct a representation of the geographical region; performing lane-topology reasoning by a lane-topology model, using the encoded representation of the map, to detect one or more road-level features within the geographical region; and outputting feature data representing the detected one or more road-level features to an autonomous driving application; and operating the autonomous driving vehicle in response to the feature data. In an embodiment, the device receives or is provided with the encoded representation of the map. In another embodiment, the device encodes a representation of the map having the road-level topology to form the encoded representation of the map. In an embodiment, the feature data is the one or more road-level features detected by the lane-topology model. In another embodiment, the feature data is data generated (e.g. derived, computed, etc.) based on the one or more road-level features detected by the lane-topology model.

Figure 4:
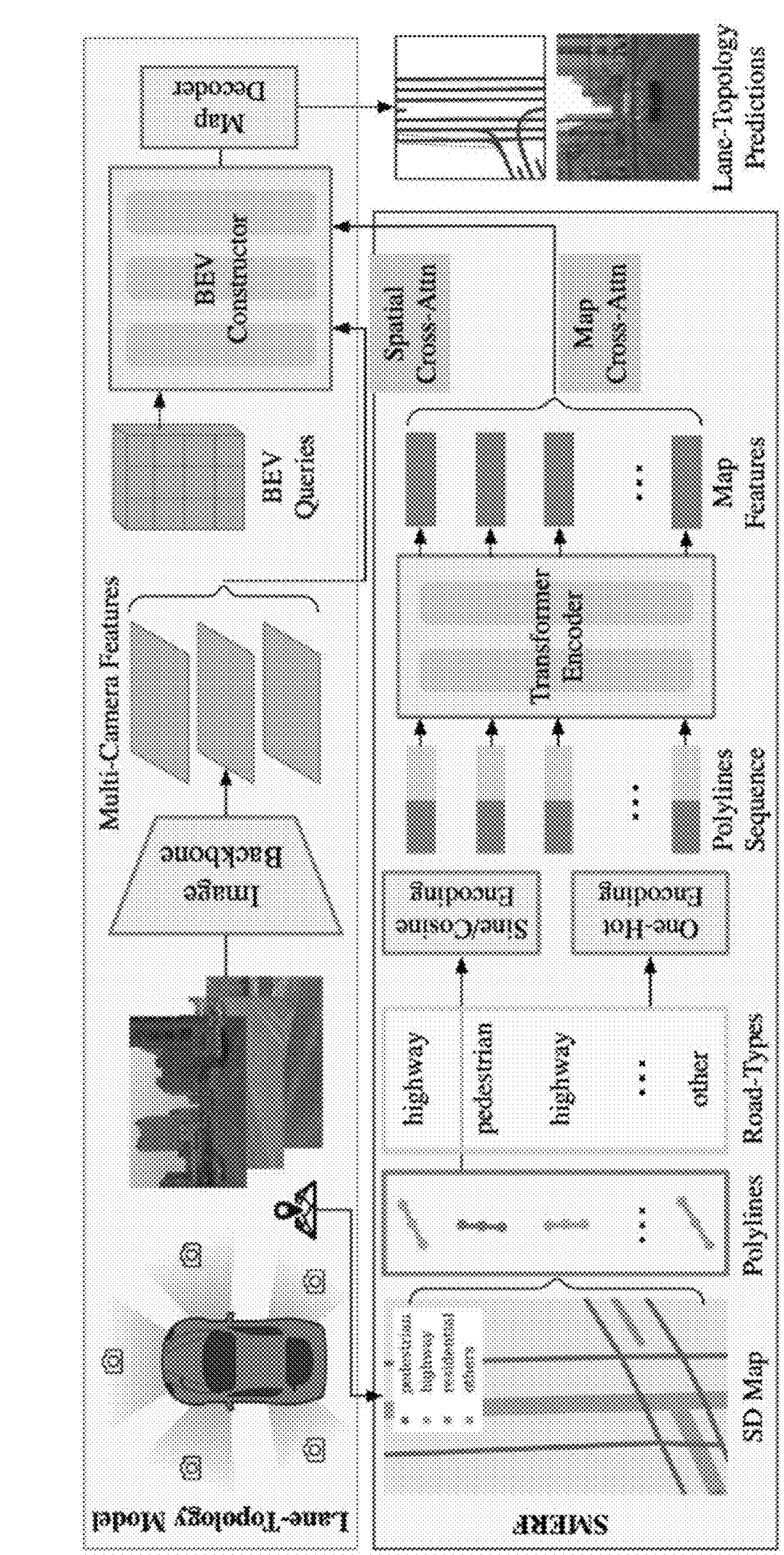
FIG. 4 illustrates a processing pipeline of components of the autonomous driving system of FIG. 3, in accordance with an embodiment.

FIG. 4 illustrates a processing pipeline 400 of components of the autonomous driving system of FIG. 3, in accordance with an embodiment.

The present embodiment assumes a multi-camera setup: the autonomous driving vehicle is equipped with C synchronized, multi-view cameras and their corresponding camera intrinsic and extrinsic parameters. The processing pipeline 400 has access to the camera images, a repository of SD maps, and the autonomous driving vehicle's 2D position and heading as a 3-depth of field (3-DoF) rigid transformation Gp from a global positioning system (GPS) that is used to align the SD maps with onboard sensor inputs. From these inputs, the task is to detect the lane centerlines of the road and the traffic elements of the scene such as the traffic lights and stop signs. Further, the connectivity of the lane centerlines is inferred as well as how they relate to each traffic element. All pairwise relationships are represented as affinity matrices.

The pipeline of the map encoder (also referred to as SD Map Encoder Representations from transFormers, or SMERF) is shown. The proposed SMERF (lower half) augments an existing lane-topology model (upper half) with priors from SD maps in order to better detect lane centerlines and relational reasoning. Specifically, the SD map relevant to the vehicle's location is retrieved, and is encoded into a feature representation using a transformer encoder. Cross-attention between the SD map feature representation is then applied with the features from onboard camera inputs to construct the bird's eye view (BEV) features for lane detection and relational reasoning. The pipeline is trained end-to-end with the lane-topology model without requiring any additional training signals.

SD Map Input

SD maps may be obtained from a crowd-sourced platform offering SD maps and geographical details of worldwide locations. Concretely, SD maps may contain road-level topology (i.e. road geometry and connectivity) and annotated type-of-road information for each road segment (e.g. highway, residential roads, and pedestrian crossings). For every frame, a local SD map is extracted from the platform based on the vehicle's position from Gp. The resulting SD map encompasses M polylines, where each polyline corresponds to a road segment. Notably, the point location of the polylines is transformed to the vehicle's coordinates using Gp. Moreover, each polyline is further annotated with specific road-type labels.

Encoding Representation from SD Maps

In order to encode the SD map in a form that can be consumed by the downstream lane-topology model (e.g. model 304 of FIG. 3), a polyline-sequence representation and a transformer encoder (e.g. map encoder 302 of FIG. 3) are used to obtain the final map representation for the scene.

Polyline Sequence Representation. Given the SD map of the scene, each of the M polylines are evenly sampled for a fixed number of N points, denoted by $$\{(x_i, y_i)\}_{i=1}^{N}.$$

Sinusoidal embeddings with varied frequencies are employed to encode the polyline point locations. Sinusoidal embeddings enhance the sensitivity to positional variations. This sensitivity benefits the model, enabling it to effectively reason about the structure of polylines.

Given a coordinate position $p \in \{x_i, y_i\}$ and an embedding dimension $j \in \{1 \ldots d/2\}$, the sinusoidal embedding can be formulated per Equation 1.

$$E(p, 2j) = \sin\left(\frac{p}{T^{\frac{2j}{d}}}\right) \qquad \text{Equation 1}$$

$$E(p, 2j+1) = \cos\left(\frac{p}{T^{\frac{2j}{d}}}\right)$$

where d temperature scale. This enables the transformation of $(x_i, y_i)$ coordinates into their corresponding sinusoidal embeddings of dimension d. In an embodiment, each polyline's coordinates are normalized with respect to the BEV range into the range of (0, 2π) prior to embedding them.

A one-hot vector representation is used for the road-type label with dimension K for the main types of lanes present in the SD maps. This not only ensures that input values are normalized between 0 and 1, but also addresses cases where a road segment may fall into multiple road types. Finally, the polyline positional embeddings are concatenated with the road type as one-hot vectors for the final polyline sequence representation with shape M×(N·d+K).

Transformer Encoder of Map Features. Given the polyline sequence representation of the SD map, a transformer encoder is used to learn a feature representation for the downstream lane-topology task. The polyline sequence is embedded with a linear layer, typical of transformer encoder architectures. This ensures that the discrete, one-hot representation of the road-types can be meaningfully transformed into continuous space. L layers of multi-head self-attention are then used to extract and encode the global geometric and semantic information from the SD map input. The resultant output has a shape of M×H, where H denotes the feature dimension produced by the self-attention layer.

Lane-Topology Prediction with SMERF

The SD map representation from SMERF can now be used by any transformer-based lane-topology model. One paradigm for lane detection and relational reasoning models may consist of a BEV transformer encoder and a map decoder. In the present embodiment, the lane-topology model is augmented with features representations from the SD map. While prior art methods only leverage multi-view camera inputs, and have difficulty predicting in areas that are occluded or are far away, the embodiments disclosed herein use the additional SD map information which allows the model to reason about these blind spots.

In an embodiment, SMERF fuses the SD map features with the intermediate BEV feature representations by leveraging multi-head cross-attention. This method is compatible with nearly all transformer-based lane-topology models by applying cross-attention between the BEV feature queries and the SD map features in each intermediate layer of the model's encoder ("Map Cross-Attn"). The SD map features are cross-attended after each spatial cross-attention operation. Thus, the fused BEV features include not only the 3D information derived from the images, but also the road-level geometric information extracted from the SD map. Subsequently, the lane-topology model decoder takes the SD map-augmented features as inputs to predict the lane centerlines, traffic elements, and affinity matrices for the association of lane centerlines and traffic elements.

Figure 5:
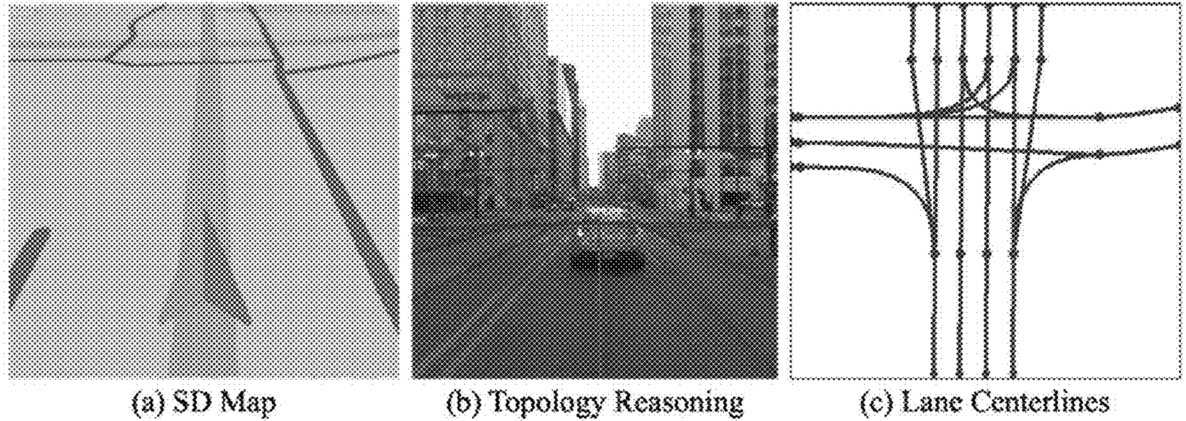
FIG. 5 illustrates a visual depiction of the inputs and outputs of the pipeline of FIG. 4, in accordance with an embodiment.

FIG. 5 illustrates a visual depiction of the inputs and outputs of the pipeline of FIG. 4, in accordance with an embodiment.

Leveraging a SD map (a) with prior information of the road-level topology, the pipeline improves the lane centerline detection (c), lane-topology reasoning between lane centerlines, and traffic elements (b). In the SD map, both roads and pedestrian ways are defined.

Figure 6:
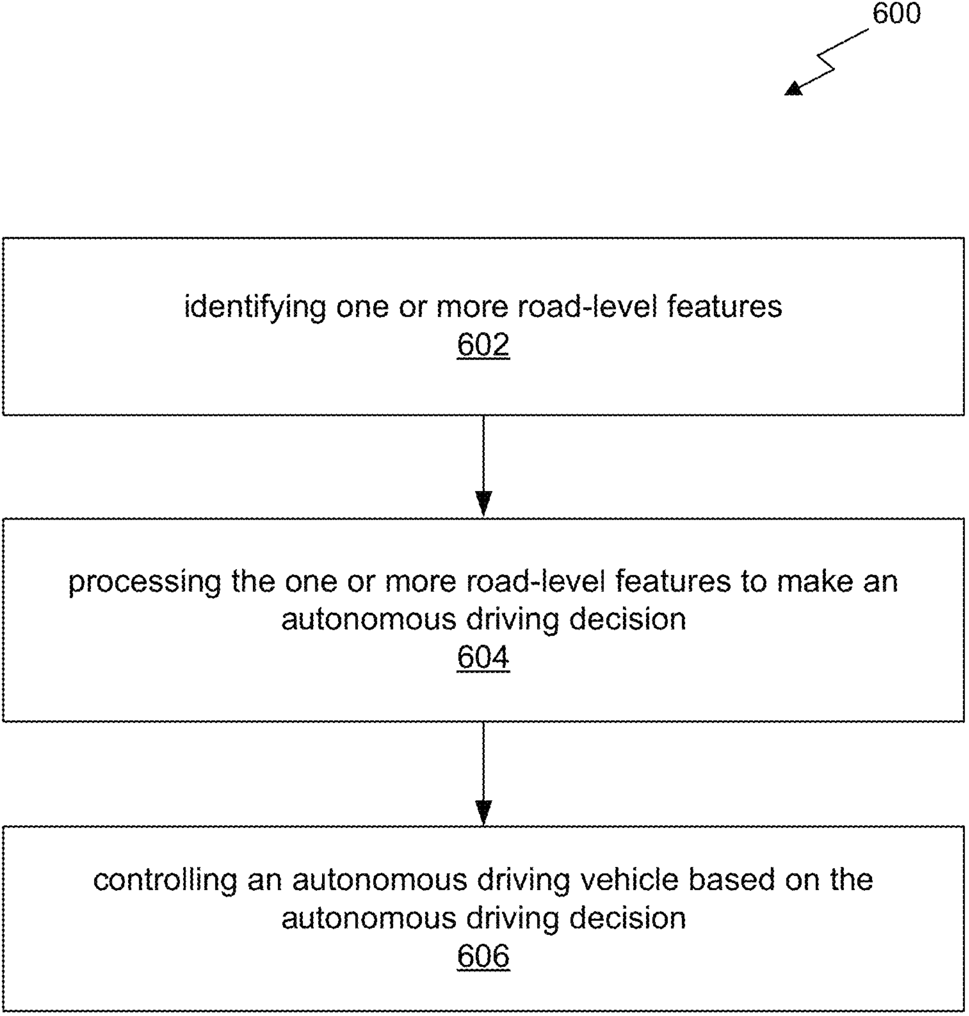
FIG. 6 illustrates a flowchart of a method for controlling an autonomous driving vehicle, in accordance with an embodiment.

FIG. 6 illustrates a flowchart of a method 600 for controlling an autonomous driving vehicle, in accordance with an embodiment. The method 600 may be carried out in the context of any of the embodiments described above. For example, the method 600 may be carried out by the autonomous driving application 306 of FIG. 3. The descriptions and definitions provided above may equally apply to the present embodiments.

In operation 602, one or more road level features are identified. With respect to the present embodiment, the one or more road level features may be identified from an output of a lane-topology model (e.g. model 304 of FIG. 3). In an embodiment, the one or more road level features may include at least one driving lane, at least one centerline of at least one driving lane, at least one traffic element (e.g. traffic light, stop sign, etc.), and/or connectivity of driving lane centerlines and relation of driving lane centerlines to traffic elements.

In operation 604, the one or more road level features are processed to make an autonomous driving decision. In an embodiment, the autonomous driving decision may be made based on preconfigured autonomous driving policies. In another embodiment, the autonomous driving decision may be made using a machine learning model trained to make autonomous driving decisions for given road level features.

In operation 606, an autonomous driving vehicle is controlled based on the autonomous driving decision. In an embodiment, a control instruction may be output to a control system of the autonomous driving vehicle to cause the autonomous driving vehicle to operate in accordance with the autonomous driving decision. In various examples, the autonomous driving vehicle may be controlled to change a direction of travel of the autonomous driving vehicle, start movement of the autonomous driving vehicle, stop movement of the autonomous driving vehicle, slow movement of the autonomous driving vehicle, change a driving lane of the autonomous driving vehicle, etc.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 715 for a deep learning or neural learning system are provided below in conjunction with FIGS. 7A and/or 7B.

In at least one embodiment, inference and/or training logic 715 may include, without limitation, a data storage 701 to store forward and/or output weight and/or input/output data corresponding to neurons or layers of a neural network trained and/or used for inferencing in aspects of one or more embodiments. In at least one embodiment data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 701 may be included with other on-chip or off-chip data storage, including a processor's L1, L2, or L3 cache or system memory.

In at least one embodiment, any portion of data storage 701 may be internal or external to one or more processors or other hardware logic devices or circuits. In at least one embodiment, data storage 701 may be cache memory, dynamic randomly addressable memory ("DRAM"), static randomly addressable memory ("SRAM"), non-volatile memory (e.g., Flash memory), or other storage. In at least one embodiment, choice of whether data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a data storage 705 to store backward and/or output weight and/or input/output data corresponding to neurons or layers of a neural network trained and/or used for inferencing in aspects of one or more embodiments. In at least one embodiment, data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 705 may be included with other on-chip or off-chip data storage, including a processor's L1, L2, or L3 cache or system memory. In at least one embodiment, any portion of data storage 705 may be internal or external to on one or more processors or other hardware logic devices or circuits. In at least one embodiment, data storage 705 may be cache memory, DRAM, SRAM, non-volatile memory (e.g., Flash memory), or other storage. In at least one embodiment, choice of whether data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 701 and data storage 705 may be separate storage structures. In at least one embodiment, data storage 701 and data storage 705 may be same storage structure. In at least one embodiment, data storage 701 and data storage 705 may be partially same storage structure and partially separate storage structures. In at least one embodiment, any portion of data storage 701 and data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710 to perform logical and/or mathematical operations based, at least in part on, or indicated by, training and/or inference code, result of which may result in activations (e.g., output values from layers or neurons within a neural network) stored in an activation storage 720 that are functions of input/output and/or weight parameter data stored in data storage 701 and/or data storage 705. In at least one embodiment, activations stored in activation storage 720 are generated according to linear algebraic and or matrix-based mathematics performed by ALU(s) 710 in response to performing instructions or other code, wherein weight values stored in data storage 705 and/or data 701 are used as operands along with other values, such as bias values, gradient information, momentum values, or other parameters or hyperparameters, any or all of which may be stored in data storage 705 or data storage 701 or another storage on or off-chip. In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 701, data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7A:
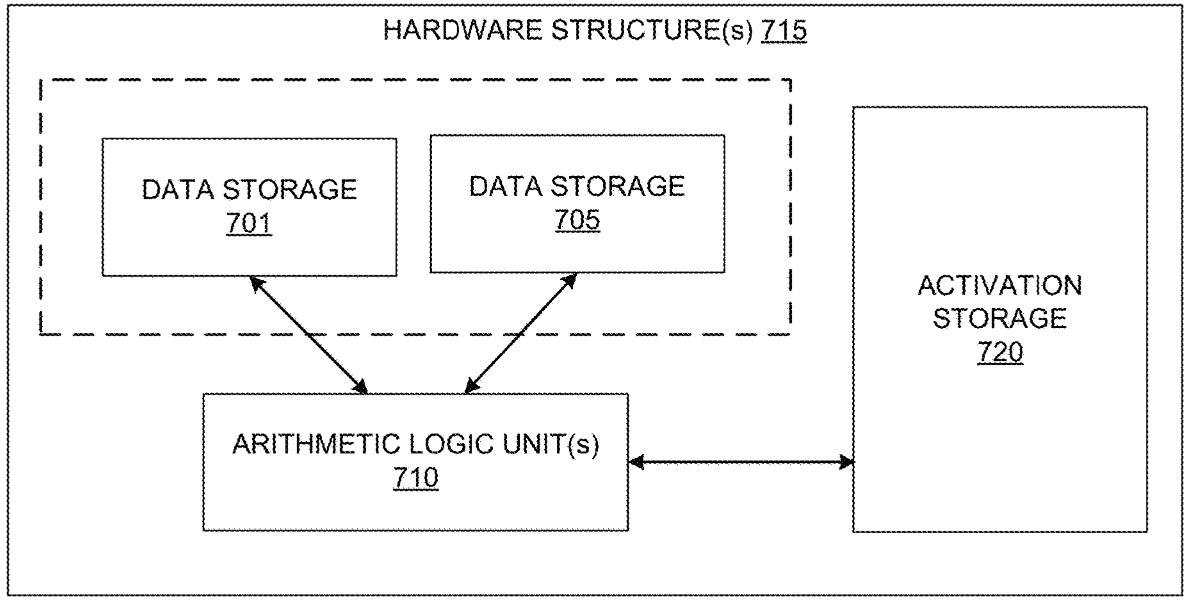
FIG. 7A illustrates inference and/or training logic, according to at least one embodiment.
Figure 7B:
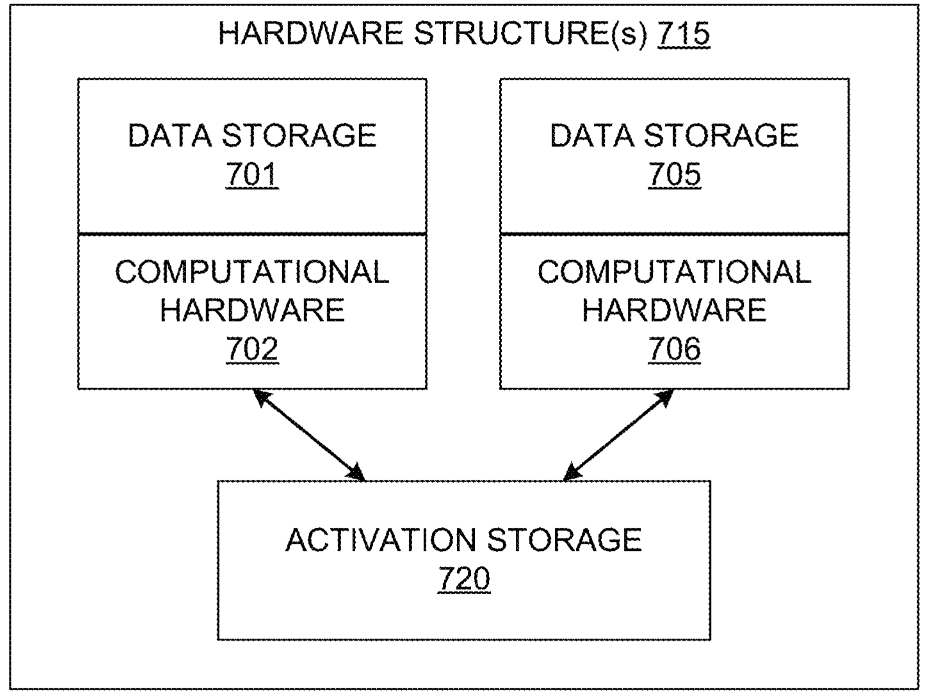
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, data storage 701 and data storage 705, which may be used to store weight values and/or other information, including bias values, gradient information, momentum values, and/or other parameter or hyperparameter information. In at least one embodiment illustrated in FIG. 7B, each of data storage 701 and data storage 705 is associated with a dedicated computational resource, such as computational hardware 702 and computational hardware 706, respectively. In at least one embodiment, each of computational hardware 706 comprises one or more ALUs that perform mathematical functions, such as linear algebraic functions, only on information stored in data storage 701 and data storage 705, respectively, result of which is stored in activation storage 720.

In at least one embodiment, each of data storage 701 and 705 and corresponding computational hardware 702 and 706, respectively, correspond to different layers of a neural network, such that resulting activation from one "storage/computational pair 701/702" of data storage 701 and computational hardware 702 is provided as an input to next "storage/computational pair 705/706" of data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Neural Network Training and Deployment

Figure 8:
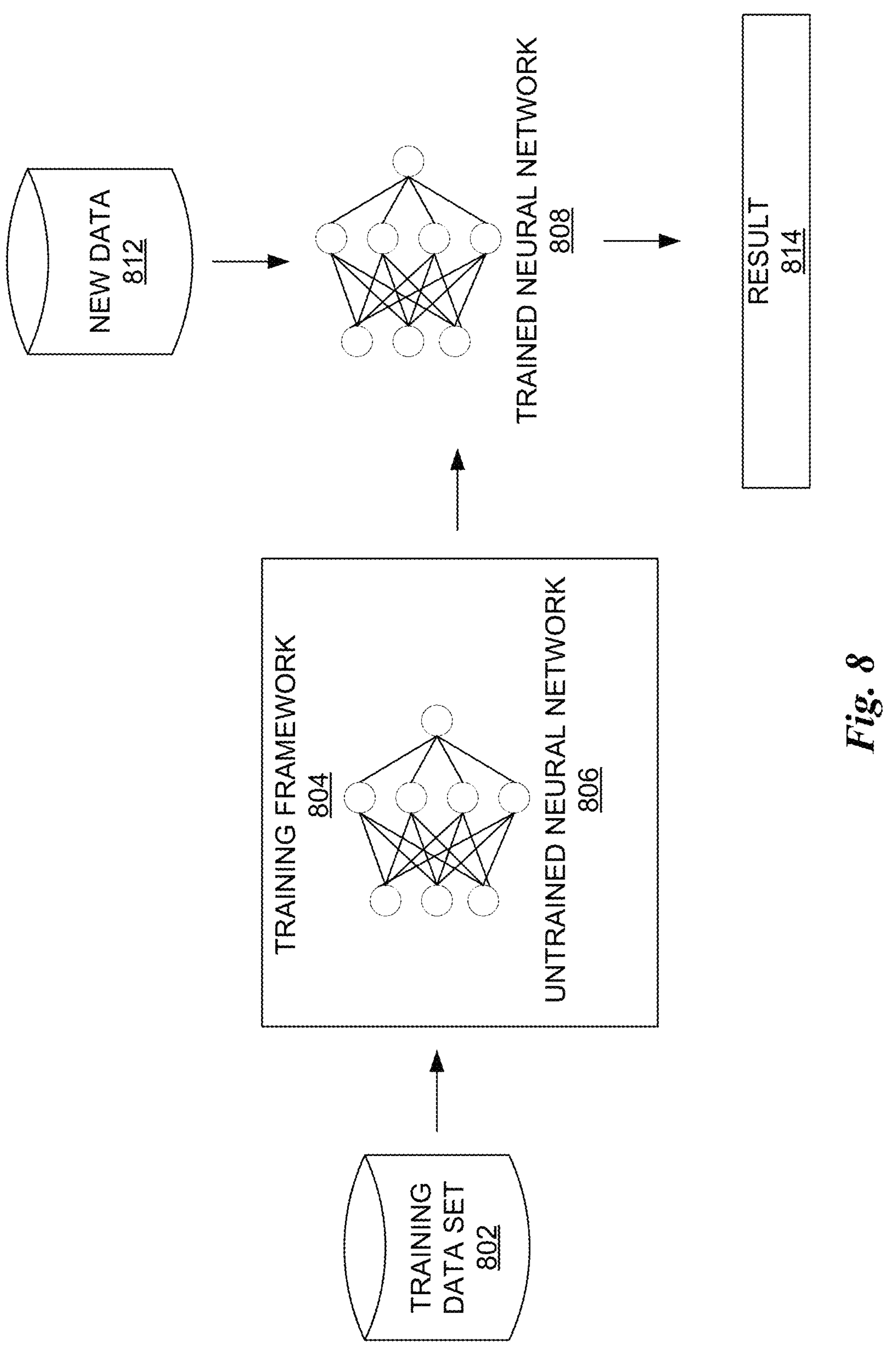
FIG. 8 illustrates training and deployment of a neural network, according to at least one embodiment.

FIG. 8 illustrates another embodiment for training and deployment of a deep neural network. In at least one embodiment, untrained neural network 806 is trained using a training dataset 802. In at least one embodiment, training framework 804 is a PyTorch framework, whereas in other embodiments, training framework 804 is a Tensorflow, Boost, Caffe, Microsoft Cognitive Toolkit/CNTK, MXNet, Chainer, Keras, Deeplearning4j, or other training framework. In at least one embodiment training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having known output and the output of the neural network is manually graded. In at least one embodiment, untrained neural network 806 is trained in a supervised manner processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on known input data, such as new data 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map, which is a type of trained neural network 808 capable of performing operations useful in reducing dimensionality of new data 812. In at least one embodiment, unsupervised training can also be used to perform anomaly detection, which allows identification of data points in a new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new data 812 without forgetting knowledge instilled within network during initial training.

Data Center

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

As described herein, a method, computer readable medium, and system are disclosed for training a 3D object detector. In accordance with FIGS. 1-6, embodiments may provide the 3D object detector as a machine learning model usable for performing inferencing operations and for providing inferenced data. The 3D object detector may be stored (partially or wholly) in one or both of data storage 701 and 705 in inference and/or training logic 715 as depicted in FIGS. 7A and 7B. Training and deployment of the 3D object detector may be performed as depicted in FIG. 8 and described herein. Distribution of the 3D object detector may be performed using one or more servers in a data center 900 as depicted in FIG. 9 and described herein.

What is claimed is:

1. A method, comprising:

at a device:

encoding a representation of a map defining road geometry and road connectivity in a geographical region to form a first feature representation of the geographical region;

generating a second feature representation of the geographical region from at least one image of the geographical region captured by at least one camera installed on an autonomous driving vehicle;

applying cross-attention between the first feature representation and the second feature representation to construct a combined feature representation for the geographical region that includes information derived from the at least one image of the geographical region and information from the map;

performing lane-topology reasoning by a lane-topology model, using the combined feature representation, to detect one or more road-level features within the geographical region;

using the one or more road-level features to make one or more autonomous driving decisions for the autonomous driving vehicle; and controlling operation of the autonomous driving vehicle based on the one or more autonomous driving decisions.

2. The method of claim 1, wherein the map is a standard definition (SD) map.

3. The method of claim 1, wherein the map includes annotations indicating road types for each road segment defined in the map.

4. The method of claim 1, wherein the geographical region is an area in which the autonomous driving vehicle is located.

5. The method of claim 1, wherein the representation of the map is a polyline-sequence representation.

6. The method of claim 5, further comprising at the device:

generating the polyline-sequence representation by sampling the map along each of a plurality of polylines for a fixed number of points.

7. The method of claim 6, wherein sinusoidal embeddings with varied frequencies are used to encode polyline point locations in the polyline-sequence representation.

8. The method of claim 1, wherein the representation of the map is encoded by a transformer encoder.

9. The method of claim 8, wherein the transformer encoder learns the first feature representation of the geographical region from the representation of the map.

10. The method of claim 8, wherein the representation of the map is encoded by:

embedding the representation of the map with a linear layer of the transformer encoder, and utilizing a number of layers of multi-head self-attention to extract and encode global geometric and semantic information into the first feature representation of the geographical region.

11. The method of claim 1, wherein the lane-topology model is a transformer-based model.

12. The method of claim 1, wherein the second feature representation of the geographical region is a bird's-eye-view representation.

13. The method of claim 1, wherein the one or more road-level features include at least one driving lane.

14. The method of claim 1, wherein the one or more road-level features include at least one centerline of at least one driving lane.

15. The method of claim 1, wherein the one or more road-level features include traffic elements.

16. The method of claim 1, wherein the one or more road-level features include connectivity of driving lane centerlines and relation of driving lane centerlines to traffic elements.

17. A system, comprising:

a non-transitory memory storage comprising instructions; and one or more processors in communication with the memory, wherein the one or more processors execute the instructions to:

encode a representation of a map defining road geometry and road connectivity in a geographical region to form a first feature representation of the geographical region;

generate a second feature representation of the geographical region from at least one image of the geographical region captured by at least one camera installed on an autonomous driving vehicle;

apply cross-attention between the first feature representation and the second feature representation to construct a combined feature representation for the geographical region that includes information derived from the at least one image of the geographical region and information from the map;

perform lane-topology reasoning by a lane-topology model, using the combined feature representation, to detect one or more road-level features within the geographical region;

use the one or more road-level features to make one or more autonomous driving decisions for the autonomous driving vehicle; and control operation of the autonomous driving vehicle based on the one or more autonomous driving decisions.

18. The system of claim 17, wherein the map includes annotations indicating road types for each road segment defined in the map.

19. The system of claim 17, wherein the representation of the map is encoded by a transformer encoder.

20. The system of claim 19, wherein the transformer encoder learns the first feature representation of the geographical region from the representation of the map.

21. The system of claim 17, wherein the lane-topology model is a transformer-based model.

22. The system of claim 17, wherein the second feature representation of the geographical region is a bird's-eye-view representation.

23. The system of claim 17, wherein the lane-topology reasoning includes at least one of:

lane detection, lane centerline detection, or traffic element detection.

24. The system of claim 17, wherein the lane-topology reasoning includes inferring connectivity of lane centerlines and relation of lane centerlines to traffic elements.

25. A non-transitory computer-readable medium comprising computer instructions executable by one or more processors of a device to cause the device to:

encode a representation of a map defining road geometry and road connectivity in a geographical region to form a first feature representation of the geographical region;

generate a second feature representation of the geographical region from at least one image of the geographical region captured by at least one camera installed on an autonomous driving vehicle;

apply cross-attention between the first feature representation and the second feature representation to construct a combined feature representation for the geographical region that includes information derived from the at least one image of the geographical region and information from the map;

perform lane-topology reasoning by a lane-topology model, using the combined feature representation, to detect one or more road-level features within the geographical region;

use the one or more road-level features to make one or more autonomous driving decisions for the autonomous driving vehicle; and control operation of the autonomous driving vehicle based on the one or more autonomous driving decisions.

26. The non-transitory computer-readable medium of claim 25, wherein the lane-topology reasoning includes at least one of:

lane detection, lane centerline detection, or traffic element detection.

27. The non-transitory computer-readable medium of claim 25, wherein the lane-topology reasoning includes inferring connectivity of lane centerlines and relation of lane centerlines to traffic elements.

* * * * *